(12) United States Patent
Arai et al.

(10) Patent No.: US 9,085,475 B2
(45) Date of Patent: Jul. 21, 2015

(54) ULTRAPURE WATER PRODUCING METHOD AND APPARATUS

(75) Inventors: Nobukazu Arai, Tokyo (JP); Shigeki Fujishima, Tokyo (JP); Nozomu Ikuno, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 49 days.

(21) Appl. No.: 13/879,894

(22) PCT Filed: Mar. 11, 2011

(86) PCT No.: PCT/JP2011/055782
§ 371 (c)(1),
(2), (4) Date: Jul. 23, 2013

(87) PCT Pub. No.: WO2012/053233
PCT Pub. Date: Apr. 26, 2012

(65) Prior Publication Data
US 2013/0292330 A1    Nov. 7, 2013

(30) Foreign Application Priority Data

Oct. 18, 2010 (JP) ................. 2010-233530

(51) Int. Cl.
*C02F 3/30* (2006.01)
*C02F 9/00* (2006.01)
(Continued)

(52) U.S. Cl.
CPC . *C02F 3/302* (2013.01); *C02F 9/00* (2013.01); *C02F 1/32* (2013.01); *C02F 1/42* (2013.01);
(Continued)

(58) Field of Classification Search
USPC ................. 210/610–611, 615–617
See application file for complete search history.

(56) References Cited

U.S. PATENT DOCUMENTS 4,925,802 A * 5/1990 Nelson et al. ............... 435/262
5,385,664 A   1/1995 Oinuma et al.
(Continued)

FOREIGN PATENT DOCUMENTS

JP   06-063592 A   3/1994
JP   06-233997 A   8/1994
(Continued)

OTHER PUBLICATIONS

International Search Report of the International Searching Authority mailed May 10, 2011 for the corresponding international application No. PCT/JP2011/055782 (with English translation).
(Continued)

*Primary Examiner* — Chester Barry
(74) *Attorney, Agent, or Firm* — Posz Law Group, PLC

(57) ABSTRACT

In an ultrapure water producing method, a pre-treatment system treats raw water supplied from a raw water storage tank. A heat exchanger adjusts the treated water to a predetermined temperature before the water is supplied to a first bio-treatment means which is further connected to a second bio-treatment means. The second bio-treatment means is connected to a microbial body separation apparatus and, after treatments are performed in those apparatuses, the result is supplied as treated water to a primary pure water apparatus. Before the second bio-treatment means, a second supply mechanism is provided for adding a nitride source as a nutrient source and oxidizing agent (bactericidal agent). According to the ultrapure water producing method, urea in raw water can be removed to a high degree.

20 Claims, 1 Drawing Sheet

(51) Int. Cl.
*C02F 101/16* (2006.01)
*C02F 1/32* (2006.01)
*C02F 1/42* (2006.01)
*C02F 1/44* (2006.01)
*C02F 1/50* (2006.01)
*C02F 3/10* (2006.01)
*C02F 103/04* (2006.01)

(52) U.S. Cl.
CPC . *C02F 1/441* (2013.01); *C02F 1/50* (2013.01); *C02F 3/106* (2013.01); *C02F 3/308* (2013.01); *C02F 2101/16* (2013.01); *C02F 2103/04* (2013.01); *C02F 2303/20* (2013.01); *C02F 2305/06* (2013.01)

(56) References Cited

U.S. PATENT DOCUMENTS

| | | | | |
|---|---|---|---|---|
| 5,578,210 | A | * | 11/1996 | Klecka .......... 210/610 |
| 5,766,929 | A | * | 6/1998 | Orolin et al. .......... 435/262 |
| 5,833,857 | A | * | 11/1998 | Roth .......... 210/610 |
| 6,214,619 | B1 | * | 4/2001 | Sato et al. .......... 435/397 |
| 2007/0051676 | A1 | * | 3/2007 | Chandraghatgi et al. .... 210/611 |
| 2009/0283471 | A1 | | 11/2009 | Tanaka et al. |

FOREIGN PATENT DOCUMENTS

| | | |
|---|---|---|
| JP | 07-313994 A | 12/1995 |
| JP | 11-138187 A | 5/1999 |
| JP | 2001-038390 A | 2/2001 |
| JP | 2001-149974 A | 6/2001 |
| JP | 2004-033953 A | 2/2004 |
| JP | 2004-082107 A | 3/2004 |
| JP | 2005-246135 A | 9/2005 |
| JP | 2007-160233 A | 6/2007 |
| JP | 2007-175582 A | 7/2007 |
| JP | 2009-066505 A | 4/2009 |

OTHER PUBLICATIONS

Office Action mailed Mar. 24, 2015 issued in corresponding JP patent application No. 2010-233530.

* cited by examiner

ULTRAPURE WATER PRODUCING METHOD AND APPARATUS

CROSS REFERENCE TO RELATED APPLICATIONS

This application is a U.S. national stage application of PCT/JP2011/055782 filed on Mar. 11, 2011, and claims priority to, and incorporates by reference, Japanese Patent Application No. 2010-233530 filed on Oct. 18, 2010.

TECHNICAL FIELD

The present invention relates to a method of producing ultrapure water, wherein treated water obtained by performing bio-treatment on raw water containing organic substances is treated in a primary pure water apparatus and a secondary pure water apparatus, and particularly relates to a method of producing ultrapure water, by which urea in raw water can be removed to a high degree.

BACKGROUND ART

Conventionally, an ultrapure water producing apparatus for producing ultrapure water from raw water, such as city water, ground water and industrial water, is basically configured by a pre-treatment apparatus, a primary pure water producing apparatus and a secondary pure water producing apparatus. Among them, the pre-treatment apparatus is configured by coagulating, floating and filtering apparatuses. The primary pure water producing apparatus is configured, for example, by two reverse osmosis membrane separation apparatuses and a mixed bed ion-exchange apparatus or by an ion-exchange pure water apparatus and a reverse osmosis membrane separation apparatus. The secondary pure water producing apparatus is configured, for example, by a low-pressure ultraviolet ray oxidizing apparatus, a mixed bed ion-exchange apparatus and an ultra-filtration membrane separation apparatus.

In an ultrapure water producing apparatus as such, demands for improving the purity have been increasing and, along therewith, removal of TOC components has been demanded. Among the TOC components in ultrapure water, particularly urea is hard to be removed, and the more the TOC components are reduced, the more removal of urea affects a content of the TOC components. Therefore, removing TOC sufficiently in ultrapure water by removing urea from water to be supplied to an ultrapure water producing apparatus has been described in the patent articles 1 to 3.

The patent article 1 discloses incorporating a bio-treatment apparatus in a pre-treatment apparatus and decomposing urea by the bio-treatment apparatus. Also, in the patent article 2, a bio-treatment apparatus is incorporated in the pre-treatment apparatus and mixed water of water to be treated (industrial water) and collected water from semiconductor cleaning is brought to flow through it. And it is disclosed that organic substances contained in the collected water from semiconductor cleaning become a carbon source for bio-treatment reaction and improve decomposing speed of urea. Note that a large amount of ammonium, ions ($NH_4^+$) is included in the collected water from semiconductor cleaning in some cases, and they sometimes become a nitride source as same as urea and hinder decomposition of urea. Furthermore, the patent article 3 describes, in order to solve the problem in the patent article 2 above, that water to be treated (industrial water) and collected water from semiconductor cleaning are subjected to bio-treatment separately before being mixed and brought to flow through the primary pure water producing apparatus and secondary pure water producing apparatus.

PRIOR ART DOCUMENTS

Patent Articles

[Patent Article 1] Japanese Patent Publication (Kokai) No. H06-63592
[Patent Article 2] Japanese Patent Publication (Kokai) No. H06-233997
[Patent Article 3] Japanese Patent Publication (Kokai) No. H07-313994

SUMMARY OF THE INVENTION

Object to be Achieved by the Invention

However, as in the water treatment method described in the patent article 2, when a carbon source is added to water to be treated, an efficiency of decomposing and removing urea in the bio-treatment apparatus improves, however, a growth amount of fungus bodies in the bio-treatment apparatus increases and an outflow of fungus bodies from the bio-treatment apparatus increases, which is a disadvantageous point. This is considered because the water treatment method of the patent article 2 has a mechanism that, when BOD assimilating bacteria (heterotrophic bacteria), not nitrobacteria, decompose and assimilate organic substances, urea and urea derivatives are decomposed as nitride sources and taken in as ammonium so as to remove urea and urea derivatives.

Therefore, the present inventors have proposed a water treatment method and ultrapure water, wherein a nitride source is added to raw water before performing bio-treatment, consequently, urea can be removed to a low concentration in a short time (Patent Application No. 2010-105151, etc.).

In this method, however, it has turned out that because an improvement of the urea decomposition efficiency can be achieved due to the involvement from a nitrobacteria group, when a concentration of organic substances in the raw water is high, in particular, when a concentration of easily decomposable organic substances is high, growth and activity of BOD assimilating bacteria (heterotrophic bacteria) become high, so that growth and activity of the nitrobacteria group decline, the urea decomposition efficiency declines and it becomes hard to obtain ultrapure water wherein urea is reduced sufficiently. Specifically, as a result that growth and activity become high in BOD assimilating bacteria, a nitride source to be added as nutrient source is used by the BOD assimilating bacteria, and other phosphor and trace metal (minerals, etc.), etc. contained in the raw water are also used by the BOD assimilating bacteria and so forth, therefore, growth and activity of the nitrobacteria group decline.

The present invention was made in consideration of the above disadvantages and has an object thereof to provide a method of producing ultrapure water, by which TOC, particularly, urea in raw water can be highly decomposed and removed and higher-purity ultrapure water can be produced.

Means for Achieving the Object

To achieve the above object, the present invention provides an ultrapure water producing method, by which treated water obtained by performing bio-treatment on raw water containing organic substances is treated in a pure water producing apparatus: wherein the bio-treatment comprises a first bio-treatment means and a second bio-treatment means, and treated water of the first bio-treatment means is added with a nutrient source for the second bio-treatment means (Invention 1).

According to the invention above (Invention 1), firstly in the first bio-treatment means, organic substances, particularly, easily-decomposable organic substances in raw water are removed so as to reduce an amount of the easily-decomposable organic substances to be supplied to the subsequent second bio-treatment means and heightening of growth and activity of BOD assimilating bacteria can be suppressed. As a result of suppressing heightening of growth and activity of BOD assimilating bacteria while adding a nutrient source, such as an ammoniac nitride source, of the second bio-treatment means, bio-treatment mainly with nitrobacteria can be performed and a high urea removal efficiency can be achieved. Also, consumption of the nutrient source by the BOD assimilating bacteria in the second bio-treatment means can be suppressed, so that there arises an effect that the treatment can be performed with less nutrient source.

In the invention above (Invention 1), the first bio-treatment is preferably a bio-treatment means having a fixed bed of organism carrying carrier (Invention 2) Also, in the invention above (Invention 1), the second bio-treatment is preferably a bio-treatment means having a fixed bed of organism carrying carrier (Invention 3).

According to the inventions (Inventions 2 and 3), since the bio-treatment means comprises a fixed bed of organic carrying carrier, an outflow of fungus bodies from the bio-treatment means can be suppressed more compared with the case with a fluidized bed, effects of the treatment become high and the effects can be maintained for a long time.

In the inventions above (Inventions 1 to 3), a nutrient source of the second bio-treatment means is a nitride source (Invention 4).

According to the invention above (Invention 4), ammonium chloride and other ammonium salts are suitable for activation of a nitrobacteria group, furthermore, since adding and controlling thereof are easy, it is suitable for maintaining a urea concentration low.

Effects of the Invention

According to the ultrapure water producing method of the present invention, when treated water obtained by performing bio-treatment on raw water containing organic substances is treated in a pure water producing apparatus to produce ultrapure water, the bio-treatment comprises a first bio-treatment means and a second bio-treatment means and treated water of the first bio-treatment means is added with a nutrient source for the second bio-treatment means, so that ultrapure water can be produced with a high efficiency in removing urea. Also, it is possible to suppress consumption of the nutrient source by BOD assimilating bacteria in the second bio-treatment means, therefore, there arises an effect of performing the treatment with less nutrient source.

MODE(S) FOR CARRYING OUT THE INVENTION

Figure 1:
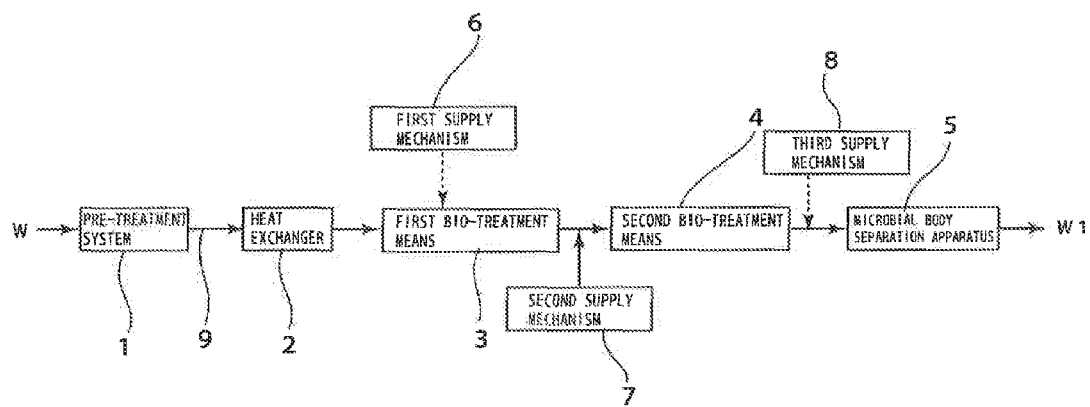
FIG. 1 A system diagram showing a bio-treatment apparatus in an ultrapure water producing method according to an embodiment of the present invention.

Below, an explanation will be made on an embodiment of the present invention with reference to the attached drawings. FIG. 1 is a schematic view showing a bio-treatment apparatus for implementing a water treatment method according to an embodiment of the ultrapure water producing method of the present invention.

In FIG. 1, the reference number 1 is a pre-treatment system for raw water W to be supplied from a not shown raw water storage tank and the raw water W treated in the pre-treatment system 1 is adjusted to be a predetermined temperature by a heat exchanger 2, then, supplied to a first bio-treatment means 3, which is further connected to a second bio-treatment means 4. The second bio-treatment means 4 is connected to a microbial body separation apparatus 5 and, after being treated in these apparatuses, the result is supplied as treated water W1 to a primary pure water apparatus.

In a step before the first bio-treatment means 3, a first supply mechanism 6 is provided for adding easily-decomposable organic substances, an oxidizing agent and bactericidal agent and, in a step before the second bio-treatment means 4, a second supply mechanism 7 is provided for adding a nitride source as a nutrient source and an oxidizing agent (bactericidal agent). Furthermore, in a later step of the second bio-treatment means 4, a third supply mechanism 8 is provided for supplying a reducing agent and slime control agent. Note that the reference number 9 is a pipe to feed raw water W, etc.

In the bio-treatment apparatus configured as explained above, as raw water W to be treated, ground water, river water, city water, other industrial water and collected water from semiconductor manufacturing processes, etc. may be used. A urea concentration in the raw water (water to be treated) is preferably 5 to 200 μg/L and particularly 5 to 100 μg/L or so.

Also, as the pre-treatment system 1, a general pre-treatment system in ultrapure water producing processes or a similar treatment thereto is preferable. Specifically, a treatment system including coagulation, pressure floatation and filtration, etc. may be used.

The first bio-treatment means 3 is a means for implementing a treatment of decomposing and stabilizing contamination substances in sewage or other waste water by utilizing biotic working, which is separated to an aerobic treatment and an anaerobic treatment. Generally, organic substances are decomposed by oxygen respiration, nitric acid respiration and fermentation process, etc. and gasified or taken in by microorganisms then removed as sludge in the bio-treatment. A treatment of removing nitride (a nitrification denitrification method) and phosphor (a biotic phosphor removing method) can be also performed. A means for performing a bio-treatment as such is generally called a biological reactor. The first bio-treatment means 3 as such is not particularly limited but those provided with a fixed bed of organism-carrying carrier are preferable. Particularly, a downward flow type fixed bed is preferable for less microbial body outflow.

When the first bio-treatment means 5 has a fixed bed, the fixed bed is preferably cleaned as needed. Thereby, it is possible to prevent blocking of the fixed bed due to growth of living organisms (fungus bodies), forming of mad balls and a decline of efficiency in urea decomposition and removal, etc. The cleaning method is not particularly limited but, for example, backwashing is preferable, that is, to let cleaning water flow in the reverse direction from the raw water flowing direction to fluidize carriers, discharge deposition substances to outside the system, crush mad balls and remove a part of living organisms, etc.

Also, a kind of carriers on the fixed bed is not particularly limited and activated carbon, anthracite, sand, zeolite, ion-exchange resin and plastic molded piece, etc. may be used, but carriers consuming a small amount of oxidizing agent are preferable for performing a bio-treatment in the presence of an oxidizing agent. However, in the case where there is a possibility that an oxidizing agent flows in to be at a high concentration to the bio-treatment means, carriers capable of decomposing oxidizing agents, such as activated carbon, are preferably used. When using activated carbon, etc. as such, it is possible to prevent fungus bodies from becoming deactivated or dying even when the concentration of an oxidizing agent in the water to be treated is high.

As easily-decomposable organic substances to be added from the first supply mechanism 6 to the first bio-treatment means 3, acetate, citric acid and other organic acids, sodium acetate and other organic acid salts, methanol, ethanol and other alcohols, acetone and other organic solvents and other general-purpose readily biodegradable organic substances may be preferably used. Among them, organic substances having ionic character, such as sodium acetate, and other organic acid salts may be more preferably used from the viewpoint of being removable in a reverse osmosis membrane treatment or in an ion-exchange treatment by an ion-exchange resin performed as a treatment in a later step even if the added organic substances exceed the treatment capability and remain in biologically treated water.

Also, as an oxidizing agent, sodium hypochloride, chlorine dioxide and other chlorine-based oxidizing agents, etc. may be used. Furthermore, as a bactericidal agent, for example, a combined chlorine agent (combined chlorine agent having higher stability than chloramine) composed of a chlorine-based oxidizing agent and a sulfamic acid compound, and hydrogen peroxide, etc. may be used.

Next, as the second bio-treatment means 4, same one as the first bio-treatment means 3 explained above may be used and those provided with a fixed bed of organism-carrying carrier are also preferable. Particularly, a downward flow type fixed bed is preferable for less microbial body outflow.

As a nitrogen source as a nutrient source to be added from the second supply mechanism 7 in the previous step of the second bio-treatment means 4, an ammoniac nitrogen source is preferable and both of organic and inorganic ammoniac nitrogen sources may be preferably used. Among them, from the viewpoint of being easily removable in a later treatment even if the added ammoniac nitrogen source exceeds the treatment capability and remains in the biologically treated water, ammoniac nitrogen sources having ionic character, such as ammonium chloride, ammonium sulfate and other ammonium salts, may be preferably used.

Note that an object of the present embodiment is to remove urea, and it is preferable to obtain and keep fungus bodies having a more excellent urea removal capability. In terms of that, urea and urea derivatives may be added as an ammoniac nitrogen source. However, since urea and a part of urea derivatives do not have any ionic character, they are not expected to be removed in a later treatment. Therefore, when they are added in a large amount, it is highly possible that they cannot be removed in the bio-treatment and also in subsequent treatments and remain until the end. Therefore, when adding urea and urea derivatives, the adding concentration should be minimum and a method of complimenting a necessary amount of ammoniac nitrogen source with ammonium salt, etc. is preferable.

Also, as an oxidizing agent, sodium hypochloride, chlorine dioxide and other chlorine-based oxidizing agents, etc. may be used. As a bactericidal agent, for example, a combined chlorine agent (combined chlorine agent having higher stability than chloramine) composed of a chlorine-based oxidizing agent and a sulfamic acid compound, and hydrogen peroxide, etc. may be used.

Adding of a reducing agent and/or slime control agent from the third supply mechanism 8 in a later step of the second bio-treatment means 4 to the pipe 9 and the microbial body separation apparatus 5 are not always necessary, and any one or more of them may be provided arbitrarily depending on the circumstances. Specifically, in the case of an outflow of an oxidizing agent, etc. and in the case of an outflow of fungus bodies in the later steps of the second bio-treatment means 4, a reducing agent and/or slime control agent may be added from the third supply mechanism 8 to the pipe 9 as needed.

As to the reducing agent and slime control agent, same reducing agent as that supplied from the second supply mechanism 7 explained above may be used. Also, as the slime control agent, a bactericidal agent which does not bring any adverse effect caused by oxidation degradation, etc. in a later explained RO membrane treatment and ion-exchange treatment, etc. is preferable and, for example, a combined chlorine agent (combined chlorine agent having higher stability than chloramine) composed of a chlorine-based oxidizing agent and a sulfamic acid compound, and hydrogen peroxide, etc. may be used.

Furthermore, when an outflow of fungus bodies is observed, it is preferable that the microbial body separation apparatus 5 is provided. The microbial body separation apparatus 5 is provided in accordance with need for the purpose of preventing troubles (clog in pipe, differential pressure rise and other slime problems, and biofouling of an RO membrane, etc.) in subsequent treatments in the primary pure water apparatus, etc. caused by fungus bodies (fungus bodies separated from organism carrier) contained in the treated water in the second bio-treatment means 4. Specifically, membrane filtration (a membrane filtration treatment using a cartridge filter with a pore diameter of 0.1 µm or so) and coagulation filtration, etc. may be used.

Next, an explanation will be made on a water treatment method using the apparatuses configured as explained above and the additives, etc.

First, raw water W is supplied to the pre-treatment system 1 and murky components are removed from the raw water W, consequently, a decline of efficiency in decomposition and removal of organic substances due to the murky components in the subsequent first bio-treatment means 3 in a later step is suppressed and an increase of a pressure loss in the first bio-treatment means 3 is suppressed.

The heat exchanger 2 is used to heat the pre-treated raw water W when the water temperature is low, while cool it down when the temperature is high so as to adjust it to be a predetermined water temperature as needed. As the water temperature of the raw water W becomes higher, the reaction speed becomes higher and the decomposition efficiency improves. When the water temperature is high, a treatment tank of the first bio-treatment means 3 and the pipe 9, etc. have to have heat resistance, which may result in an increase of facility costs. While, when the water temperature of the raw water W is low, it leads to an increase of the heating cost. Specifically, as far as the water temperature is 40° C. or lower, basically the biological activity and removing speed increase as the water temperature becomes higher. However, when the water temperature exceeds 40° C., it is liable that the biological activity and removing efficiency inversely decline in some cases. From those reasons, the water temperature under the treatment is preferably 20 to 40° C. Therefore, if the initial temperature of the raw water W is within the range above, no adjustment has to be done.

The raw water W after temperature adjustment as needed as explained above is supplied to the first bio-treatment means 3, organic substances, in particular, easily-decomposable organic substances are removed first to reduce an amount of easily-decomposable organic substances in the supply water to be supplied to the second bio-treatment means 4 in a later step and to suppress increases of growth and activity of BOD assimilating bacteria. During this, easily-decomposable organic substances, oxidizing agent and/or bactericidal agent is added from the first supply mechanism 6 to the first bio-treatment means 3 in accordance with need.

Here, an adding amount of the easily-decomposable organic substances may be 0.1 to 2 mg/L (as C=carbon). When the adding amount of easily-decomposable organic substances is less than 0.1 mg/L, the capability of taking in and decomposing urea as a nitrogen source (N source) necessary for decomposing and assimilating the organic substances becomes insufficient, on the other hand, even if it exceeds 2 mg/L, not only that further urea decomposition cannot be obtained but a leakage amount from the first bio-treatment means 3 becomes too large, which is unfavorable.

Also, the adding amount of an oxidizing agent varies depending on a kind of oxidizing agent to be used and, for example, when using chlorine-based oxidizing agent, the concentration of free effective chlorine may be 1 to 10 mg/L or so and particularly 1 to 5 mg/L or so. When the adding amount of the oxidizing agent is less than 1 mg/L, oxidation decomposition of organic components is not sufficient, on the other hand, even if it exceeds 10 mg/L, not only being unable to increase the effect but a residual oxidizing agent (including free chlorine) increases, therefore, an adding amount of a reducing agent required for removing the free chlorine becomes too large. Note that a bactericidal agent may be added arbitrarily in accordance with need for the purpose of preventing troubles (clog in pipe, differential pressure rise and other slime problems, and biofouling of an RO membrane, etc.) in a later treatment caused by fungal bodies contained in the water to be treated in the first bio-treatment means 3.

The raw water W treated in the first bio-treatment means 3 is supplied to the second bio-treatment means 4, where a further bio-treatment is performed. At this time, by adding a nitride source from the second supply mechanism 7, bio-treatment mainly using a nitrobacteria group can be performed and urea can be decomposed and removed efficiently.

An adding amount of a nitrogen source may be 0.1 to 5 mg/L (in terms of $NH_4^+$). When an ammonium ion concentration in the raw water W is less than 0.1 mg/L (in terms of $NH_4^+$), it becomes difficult to keep a nitrobacteria group active, on the other hand, even if it exceeds 5 mg/L (in terms of $NH_4^+$), not only that nitrobacteria do not become more active but a leakage amount from the second bio-treatment means 4 becomes too large, which is unfavorable.

By adding a nitrogen source, particularly, ammoniac nitride source to the raw water W treated in the first bio-treatment means 3 within the range above, for example, even when a TOC concentration in the raw water W containing lots of easily-decomposable organic substances is high as 1.0 mg/L or higher and particularly 1.5 to 2.0 mg/L or so, a urea concentration can be kept to 2 µg/L or lower.

It is not always necessary to add the nitrogen source as above, particularly, an ammoniac nitrogen source and, for example, a method of adding it only in a start-up period at the time of organism carrier exchange in the second bio-treatment means 4 or a method of repeating adding and not adding in every other certain period, etc. may be used. By not always adding an ammoniac nitrogen source in this way, the effect of reducing the cost of adding a nitrogen source can be obtained, as well. Furthermore, as a result of removing easily-decomposable organic substances in the first bio-treatment means 3, activity of BOD assimilating bacteria in the first bio-treatment means 3 is suppressed, so that consumption of a nutrient source by the BOD assimilating bacteria can be suppressed in the second bio-treatment means 4 and it gives an effect of performing the treatment with less nutrient source.

Note that a bactericidal agent may be added as needed for the purpose of preventing troubles in subsequent steps (clog of pipes, differential pressure and other slime problems and biofauling of an RO film, etc.) caused by fungus bodies contained in the water to be treated in the second bio-treatment means 4.

Subsequently, the raw water W treated in the second bio-treatment means 4 is added with a reducing agent and/or slime control agent from the third supply mechanism 8 in accordance with need.

Specifically, when free chlorine exists in supply water of the bio-treatment and ammonium salt, etc. is added as an ammoniac nitrogen source, free chlorine reacts with ammonium ions to generate combined chlorine (chloramine). Combined chlorine is hard to be removed compared with free chlorine even with activated carbon, consequently, the combined chlorine results in leaking into biologically treated water. Combined chlorine is said to be a component having a lower oxidation power compared with that of free chlorine, however, it is also known that free chlorine is generated again from combined chlorine due to equilibrium reaction. Therefore, there is a possibility of causing oxidation degradation in the primary pure water treatment system, etc. in a later step. When adding a reducing agent, for example, when using sodium sulfite to reduce residual chlorine, a reducing agent may be added in an amount so that mole of sulfite ions ($SO_3^{2-}$) and that of hypochlorine ions ($ClO^-$) become equal. In terms of safety, it may be added in an amount of 1.2 to 3.0 times. Since a concentration of an oxidizing agent of water to be treated varies, more preferably, the oxidizing agent concentration of the water to be treated is monitored and an adding amount of a reducing agent is controlled in accordance therewith. Also, a simpler method of measuring the oxidizing agent concentration regularly and setting an adding amount arbitrarily in accordance with the measured concentration may be applied.

A slime control agent may be added as needed for the purpose of preventing troubles (clog of pipes, differential pressure and other slime problems and biofauling of an RO film, etc.) in later steps caused by fungal bodies (fungal bodies separated from organism carrier) contained in the water to be treated in the second bio-treatment means 4.

Furthermore, in accordance with need, fungal bodies contained in the treated water of the second bio-treatment means 4 are removed by the microbial body separation apparatus 5.

As to the adding of a reducing agent and/or slime control agent and the treatment by the microbial body separation apparatus 5, one or more of them may be performed depending on the water quality of the biologically treated water from the second bio-treatment means 4 and if the water quality is good, they may be omitted.

Since it is possible to obtain the treated water W1, wherein urea is removed to a high level in this way, when furthermore treating it with an ultrapure water producing apparatus, it is possible to produce ultrapure water, wherein urea is removed to a high degree.

Figure 2:
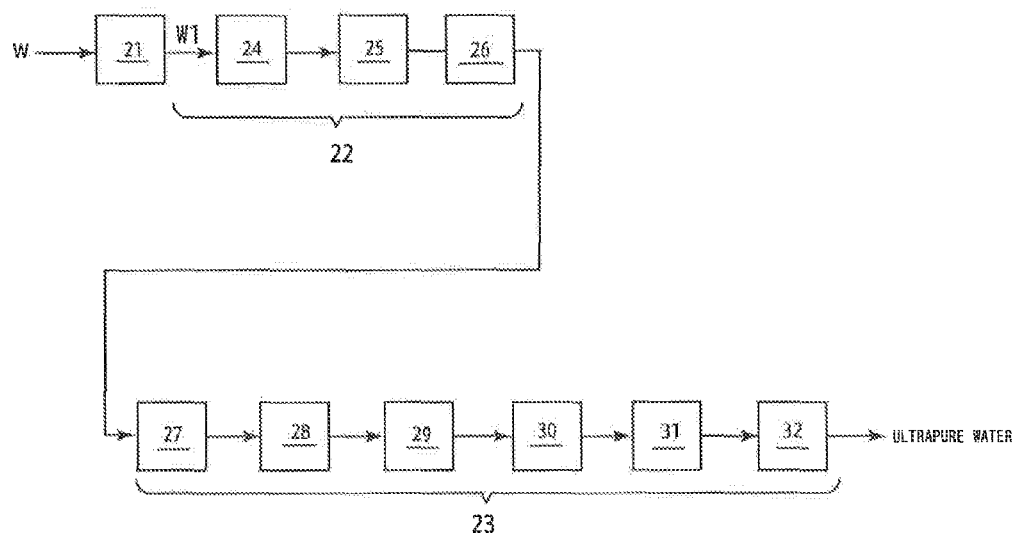
FIG. 2 A system diagram showing an apparatus for implementing the ultrapure water producing method using the bio-treatment apparatus according to the embodiment above.

Next, an ultrapure water producing method using the water treatment method according to an embodiment of the present invention will be explained with reference to FIG. 2. In the ultrapure water producing method in the present embodiment, after treating raw water W in a water treatment apparatus 21 provided with the first bio-treatment apparatus 3 and the second bio-treatment apparatus 4 explained above, the treated water W1 is furthermore treated by an ultrapure producing apparatus provided with a primary pure water apparatus 22 and a subsystem (secondary pure water apparatus) 23.

The primary pure water apparatus 22 is configured by arranging a first reverse osmosis membrane (RO) separation apparatus 24, a mixed bed ion-exchange apparatus 25 and a second reverse osmosis membrane (RO) separation apparatus 26 in this order. Note that the apparatus configuration of the primary pure water apparatus 22 is not limited to the configuration as such and may be configured, for example, by combining a reverse osmosis membrane separation apparatus, ion-exchange treatment apparatus, electric deionizing exchange apparatus, UV oxidation treatment apparatus, etc. arbitrarily.

The subsystem 23 is configured by arranging a sub tank 27, heat exchanger 28, low-pressure ultraviolet ray oxidation apparatus 29, membrane degasifier 30, mixed bed ion exchange apparatus 31 and ultrafiltration membrane apparatus (fine particle removal) 32 in this order. Note that the apparatus configuration of this subsystem 23 is not limited to the configuration as such and may be configured in combination, for example, of a UV oxidation treatment apparatus, ion-exchange treatment apparatus (non-regenerative) and UF membrane separation apparatus, etc.

An ultrapure water producing method by the ultrapure water producing system as such will be explained below. First, the treated water W1 treated in the water treatment apparatus 21 is subjected to a treatment in the primary pure water apparatus 22 to remove residual ion components, etc. in the treated water W1 by the first reverse osmosis membrane (RO) separation apparatus 24, mixed bed ion-exchange apparatus 25 and second reverse osmosis membrane (RO) separation apparatus 26.

Furthermore, in the subsystem 23, treated water from the primary pure water apparatus 22 passes through the sub tank 27 and the heat exchanger 28 and is introduced to the low-pressure ultraviolet ray oxidation apparatus 29, so that contained TOC components are ionized or decomposed. Furthermore, oxygen and carbon dioxide are removed in the membrane degasifier 30 and, successively, ionized organic substances are removed in the mixed bed ion-exchange apparatus 31 in the subsequent step. Treated water from the mixed bed ion-exchange apparatus 31 is further subjected to a membrane separation treatment in the ultrafiltration membrane separation apparatus (fine particle removal) 32 and ultrapure water can be obtained.

According to the ultrapure water producing method as explained above, by sufficiently decomposing and removing urea in the bio-treatment means 5 and by removing other TOC components, metal ions, other inorganic and organic ion components in the primary pure water apparatus 22 and the subsystem 23 in the subsequent steps, highly-pure ultrapure water can be produced efficiently.

The present invention has been explained above with reference to the attached drawings, however, the present invention is not limited to the above embodiments and may be implemented in variously modified ways. For example, the first bio-treatment means 3 may be a normal bio-treatment apparatus, and a nutrient source to be added to supply water to the second bio-treatment means 4 is not limited to an ammoniac nitride source and other nitride sources may be added or, depending on the circumstances, easily-decomposable organic substances may be added.

EXAMPLES

Below, the present invention will be explained further in detail with the examples below.

Example 1

As simulant raw water 1, what obtained by adding a proper amount of reagent urea (made by Kishida Chemical Co., Ltd.) to city water (water in Nogi-town: average urea concentration of 10 μg/L, average TOC concentration of 0.7 mg/L, ammoniac nitride concentration of less than 0.1 mg/L and average total residual chloride concentration of 0.6 mg/L as Cl2) in accordance with need was used.

As simulant raw water 2, what obtained by further adding sodium acetate (made by Kishida Chemical Co., Ltd.) to the simulant raw water 1 to adjust the TOC concentration to approximately 2 mg/L was used.

Water temperature of the city water during the test period was 25 to 30° C., therefore, water temperature of the simulant raw water 1 and simulant raw water 2 was not adjusted by the heat exchanger 2. Also, since pH of the city water was 6.8 to 7.3, sulfate (industrial dilute sulfate made by Tsurumi Soda Co., Ltd.) was added to adjust pH of the simulant raw water 1 and the simulant raw water 2 to approximately 6.0.

In an apparatus configured as shown in FIG. 1, as the first bio-treatment means 3, one having as a fixed bed a cylinder container filled with 2 L of granular activated carbon ("Kuricoal WG160, 10/32 mesh" made by Kurita Water Industries Ltd.) as organism carrier was used. As the granular activated carbon of the first bio-treatment means 3, those already exhibited decomposing capability of organic substances were used.

Furthermore, as the second bio-treatment means 4, one having as a fixed bed a cylinder container filled with 2 L of granular activated carbon ("Kuricoal WG160, 10/32 mesh" made by Kurita Water Industries Ltd.) as organism carrier was used. As the granular activated carbon of the second bio-treatment means 4, reagent urea was acclimatized and those already exhibited decomposing capability of organic substances were used.

In a bio-treatment apparatus as such, the simulant raw water 1 was pre-treated in the pre-treatment system 1 and, then, without being added anything from the first supply mechanism 6, brought to pass downwardly through the first bio-treatment means 3. The water passing speed SV was 20/hr (water pass flow amount per hour/filled activated carbon amount). In the water passing treatment in the first bio-treatment means 3 explained above, backwashing for 10 minutes was performed once a day. The backwashing was performed by using biologically treated water in an upward flow from a lower part to an upper part of the cylinder container at LV=25 m/hr (water pass flow amount per hour/cylinder container section area). A TOC concentration of the water treated by the first bio-treatment means (supply water for the second bio-treatment means 4) was 0.4 to 0.6 mg/L.

Next, the water treated by the first bio-treatment means 3 was added with ammonium chloride (made by Kishida Chemical Co., Ltd.) as an ammoniac nitride source from the second supply mechanism 7, so that a concentration of an ammoniac nitride ($NH_3$—N) became approximately 0.2 mg/L as N. Sodium hypochlorite (commercial name: Sunrack, industrial 12%-sodium hypochlorite made by Honcho Chemical Inc.) was added as an oxidizing agent so as to obtain the total residual chloride concentration of approximately 0.5 mg/L as $Cl_2$. The water to be treated added with those was brought to pass downwardly through the second bio-treatment means 4. The water passing speed SV was 20/hr (water pass flow amount per hour/filled activated carbon amount). Note that, in the water passing treatment in the second bio-treatment means 4 above, backwashing for 10 minutes was performed once a day. The backwashing was performed by using the biologically treated water in an upward flow from a lower part to an upper part of the cylinder container at LV=25 ml/hr (water pass flow amount per hour/cylinder container section area). Note that no reducing agent or slime control agent was added from the third supply mechanism 8 in a later step of the second bio-treatment means 4.

After letting the simulant raw water 1 flow continuously for 2 weeks under the water passing condition as explained above, a urea concentration of treated water W1 was measured and the result is shown in Table 1. Also, the treated water W1 was replaced with simulant raw water 2 and continuous water flow for another 2 weeks was carried out under the same condition. A urea concentration in the obtained treated water W1 was measured and the result was shown together in Table 1. Here, a TOC concentration in the treated water by the first bio-treatment means (supply water for the second bio-treatment means 4) was 0.3 to 0.5 mg/L.

Process of analyzing the urea concentration is as explained below. First, the total residual chloride concentration of test water is measured by the DPD method and a reduction treatment with sodium bisulfite in an equivalent amount is performed (after that, the total residual chloride is measured by the DPD method to make sure it is less than 0.02 mg/L). Next, the test water after the reduction treatment is brought to pass through an ion exchange resin ("KR-UM1" made by Kurita Water Industries Ltd.) at SV50/hr, subjected to a deionization treatment, being concentrated to 10 to 100 times by a rotary evaporator, then, a urea concentration is measured by the diacetylmonoxime method.

Comparative Example 1

In the example 1, other than not providing the first bio-treatment means 3, the treatment was performed in the same way on the simulant raw water 1 and the simulant water 2. Here, ammonium chloride was added but sodium hypochlorite was not added from the second supply mechanism 7. Urea concentrations in the treated water W1 of the simulant raw water 1 and that of simulant raw water 2 were measured and the results are shown in Table 1.

TABLE 1

| Example No. | Urea Concentration in Treated Water (μg/L) | |
| --- | --- | --- |
| | When Flowing Simulant Raw Water 1 | When Flowing Simulant Raw Water 2 |
| Example 1 | <2 | <2 |
| Comparative Example 1 | <2 | 10 to 20 |

As is clear from Table 1, in the example 1 with two-stage bio-treatment performed, the urea concentration was both less than 2 μm/L in the treated water W1 of the simulant raw water 1 with a low TOO concentration and in the treated water W1 of the simulant raw water 2 with a high TOC concentration, that means the urea concentration was kept low. On the other hand, in the comparative example 1 with one-stage bio-treatment, the urea concentration was less than 2 μm/L in the treated water W1 in the case of the simulant raw water 1 with a low TOC concentration but it became 10 to 20 μm/L in the treated water W1 in the simulant raw water 2 with a high TOC concentration.

This is considered because, in the example 1, even when easily-decomposable organic substances are contained in the raw water W, as a result that they are removed by the first bio-treatment means 3, the urea decomposition capability was kept in the second bio-treatment means 4; while in the comparative example 1, since the first bio-treatment means 3 is not provided, growth and activity of BOD assimilating bacteria are increased in the second bio-treatment means 4 due to easily-decomposable organic substances, which results in losing activity of nitrobacteria having a high urea removal efficiency, and the urea removal capability declined.

By applying a bio-treatment apparatus as above to production of ultrapure water, it is possible to achieve a method of producing ultrapure water, by which urea in raw water can be removed to a high degree.

EXPLANATION OF REFERENCE NUMBERS

3 . . . first bio-treatment means
4 . . . second bio-treatment means
7 . . . second supply mechanism (nutrient source adding)
W . . . raw water
W1 . . . treated water

The invention claimed is:

1. A method for producing ultrapure water from raw water containing organic substances, comprising:
    treating the raw water in a first bio-treatment process and removing easily-decomposable organic substances in the raw water; and
    treating water treated by the first bio-treatment process in a second bio-treatment process and decomposing a remaining organic substance in the raw water mainly with a nitrobacteria and removing the remaining organic substance, the second bio-treatment process including addition of a nitride source to the water treated by the first bio-treatment process and facilitating growth of the nitrobacteria for decomposing the remaining organic substance, and
    treating water treated by second bio-treatment process to pure water processing in a pure water producing apparatus and obtaining the ultrapure water.

2. The method for producing ultrapure water according to claim 1, wherein the first bio-treatment process is carried out using a fixed bed of organism carrying carrier.

3. The method for producing ultrapure water according to claim 1, wherein the second bio-treatment process is carried out in a fixed bed of organism carrying carrier.

4. The ultrapure water producing method according to claim 1, wherein the second bio-treatment process has a reduced growth and activity of heterotrophic bacteria and an increased growth and activity of the nitrobacteria compared to growth and activity of corresponding heterotrophic bacteria and nitrobacteria in the first bio-treatment process.

5. The ultrapure water producing method according to claim 1, wherein the remaining organic substance is urea.

6. The ultrapure water producing method according to claim 1, wherein the nitride source is in the range of 0.1 to 5 mg/L.

7. The ultrapure water producing method according to claim 1, wherein the nitride source is an ammoniac nitride source.

8. The ultrapure water producing method according to claim 1, wherein the first bio-treatment process is at least one of an aerobic treatment, an anaerobic treatment and sludge removal.

9. A method for producing ultrapure water from raw water containing first organic substances other than urea and second organic substances including urea, comprising:
- treating the raw water in a first bio-treatment process and removing the first organic substances; and
- treating water treated by the first bio-treatment process to a second bio-treatment process and removing at least the urea from the second organic substances, the second bio-treatment process including addition of a nitride source to the water treated by the first bio-treatment process and facilitating growth of the nitrobacteria and mainly decomposing the urea with the nitrobacteria, and
- treating water from the second bio-treatment process to pure water processing in a pure water producing apparatus and obtaining the ultrapure water.

10. The method for producing ultrapure water according to claim 9, wherein the nitride source is an ammoniac nitride source and added in the amount of 0.1 to 5 mg/L.

11. The method for producing ultrapure water according to claim 9, wherein the first bio-treatment process is at least one of an aerobic treatment, an anaerobic treatment and sludge removal.

12. An ultrapure water producing apparatus for producing ultrapure water from raw water containing urea and organic substances other than urea, comprising:
- a pre-treatment system configured to treat the raw water;
- a heat exchanger connected to the pre-treatment system and configured to maintain a temperature of the raw water between 20° C. to 40° C.;
- a first bio-treatment apparatus connected to the heat exchanger and configured to stabilize contamination substances in the raw water and to decompose and remove the other organic substances in the raw water;
- a first supply mechanism connected to the first bio-treatment apparatus and configured to introduce at least one organic substance treating material into the first bio-treatment apparatus;
- a second bio-treatment apparatus connected to the first bio-treatment apparatus and configured to decompose urea in water treated by the first bio-treatment apparatus mainly using a nitrobacteria and to remove the urea in the water treated by the first bio-treatment apparatus;
- a second supply mechanism connected between the first bio-treatment apparatus and the second bio-treatment apparatus and configured to introduce a nitride source to the water treated in the first bio-treatment apparatus, the nitrogen source facilitating growth of nitrobacteria decomposing the urea in the second bio treatment apparatus; and
- a microbial body separation apparatus connected to the second bio-treatment apparatus and configured to filter microbial bodies and effluents from water treated in the second bio-treatment apparatus.

13. The ultrapure water producing apparatus for producing ultrapure water according to claim 12, wherein the first bio-treatment apparatus is separated into an aerobic treatment area and an anaerobic treatment area.

14. The ultrapure water producing apparatus according to claim 12, wherein the first bio-treatment apparatus has a first fixed bed of an organism-carrying carrier selected from the group consisting of activated carbon, anthracite, sand, zeolite, ion-exchange resin, and plastic molded piece.

15. The ultrapure water producing apparatus according to claim 12, wherein the second bio-treatment apparatus has a second fixed bed of organism-carrying carrier.

16. The ultrapure water producing apparatus according to claim 15, wherein the second fixed bed includes an organism-carrying carrier selected from the group consisting of activated carbon, anthracite, sand, zeolite, ion-exchange resin, and plastic molded piece.

17. The ultrapure water producing apparatus according to claim 12, wherein
- the organic substance treating material supplied by the first supply mechanism acids into the first bio-treatment apparatus is selected from the group consisting of a readily-biodegradable organic substance, an oxidizing agent and a bacterial agent,
- the readily biodegradable organic substance is at least one of acetate, organic acids including citric acid, organic acid salts including sodium acetate, alcohols including methanol and ethanol and organic solvents including acetone,
- the oxidizing agent is at least one of chlorine-based oxidizing agents including sodium hypochlorite and chlorine dioxide, and
- the bacterial agent includes at least one of a chlorine-based oxidizing agent, sulfamic acid and hydrogen peroxide.

18. The ultrapure water producing apparatus according to claim 12, further comprising:
- a third supply mechanism connected between the second bio-treatment apparatus and the microbial body separation apparatus and configured to supply a reducing agent and a slime control agent.

19. The ultrapure water producing apparatus according to claim 12, further comprising:
- a primary pure water apparatus connected to the microbial body separation apparatus and configured to remove residual ion components, including:
  - a first reverse osmosis membrane separating apparatus connected to the water treatment apparatus,
  - a mixed bed ion exchange apparatus connected to the first reverse osmosis membrane separating apparatus, and
  - a second reverse osmosis membrane separating apparatus connected to the mixed bed ion exchange apparatus,
- a secondary pure water apparatus connected to the primary pure water apparatus via the second reverse osmosis membrane separating apparatus, including:
  - a subtank connected to the second reverse osmosis membrane,
  - a heat exchanger connected to the subtank,
  - a low-pressure ultraviolet ray oxidation apparatus connected to the heat exchanger,
  - a membrane degasifier connected to the low-pressure ultraviolet ray oxidation apparatus,
  - a mixed bed ion exchange apparatus connected to the membrane degasifier, and
  - an ultrafiltration membrane apparatus connected to the mixed bed ion exchange apparatus.

20. The ultrapure water producing apparatus according to claim 19,
- wherein the primary pure water apparatus further comprises an ion-exchange treatment apparatus, an electric deionizing exchange apparatus and a UV oxidation treatment apparatus, and
- wherein the secondary pure water apparatus further comprises a UV oxidation treatment apparatus, a non-regenerative ion-exchange treatment apparatus and a UF membrane separation apparatus.

* * * * *